United States Patent [19]

Fulton

[11] Patent Number: 4,727,941
[45] Date of Patent: Mar. 1, 1988

[54] POWER OPERATED RECIPROCATING HAND TOOL

[76] Inventor: Charles E. Fulton, 11 Whiffletree Rd., West Yarmouth, Mass. 02673

[21] Appl. No.: 832,366

[22] Filed: Feb. 24, 1986

[51] Int. Cl.⁴ ............................................. B25D 11/10
[52] U.S. Cl. ......................................... 173/29; 173/81; 173/114; 408/20
[58] Field of Search ................. 173/114, 122, 123, 29, 173/46, 49, 81, 48, 147, 151; 74/49, 55, 501 R, 82, 108, 89.2; 30/392, 394; 144/1 J, 1 F, 35 A, 48; 408/20, 30, 127, 21; 81/57.27, 57.43, 64

[56] References Cited

U.S. PATENT DOCUMENTS

| | | | |
|---|---|---|---|
| 1,698,952 | 1/1929 | Hoover | 408/127 |
| 2,746,493 | 5/1956 | Babcock | 144/35 A |
| 2,996,090 | 8/1961 | Smith | 144/35 A |
| 3,367,051 | 2/1968 | Tylle | 74/49 |
| 3,398,588 | 8/1968 | Meier | 408/20 |
| 3,712,751 | 1/1973 | Dietrich | 173/48 |
| 4,596,171 | 6/1986 | Gerber | 83/749 |

FOREIGN PATENT DOCUMENTS

| | | | |
|---|---|---|---|
| 3325525 | 4/1984 | Fed. Rep. of Germany | 408/127 |
| 55-54110 | 4/1980 | Japan | 408/127 |

Primary Examiner—Paul A. Bell
Assistant Examiner—James L. Wolfe
Attorney, Agent, or Firm—John M. Brandt

[57] ABSTRACT

A reciprocating hand tool arranged to be operated by a rotating power source consisting of a rotatable eccentric, a flexible sleeve, a cable within the sleeve reciprocated by the rotation of the eccentric and a device for attaching a cutting tool to the end of the cable opposite the eccentric. Two alternative cutting tool attaching device are disclosed, one which produces continuous reciprocation for sawing, filing, or sanding, the other which produces intermittent reciprocation in the nature of hammer blows for chisels and the like.

4 Claims, 5 Drawing Figures

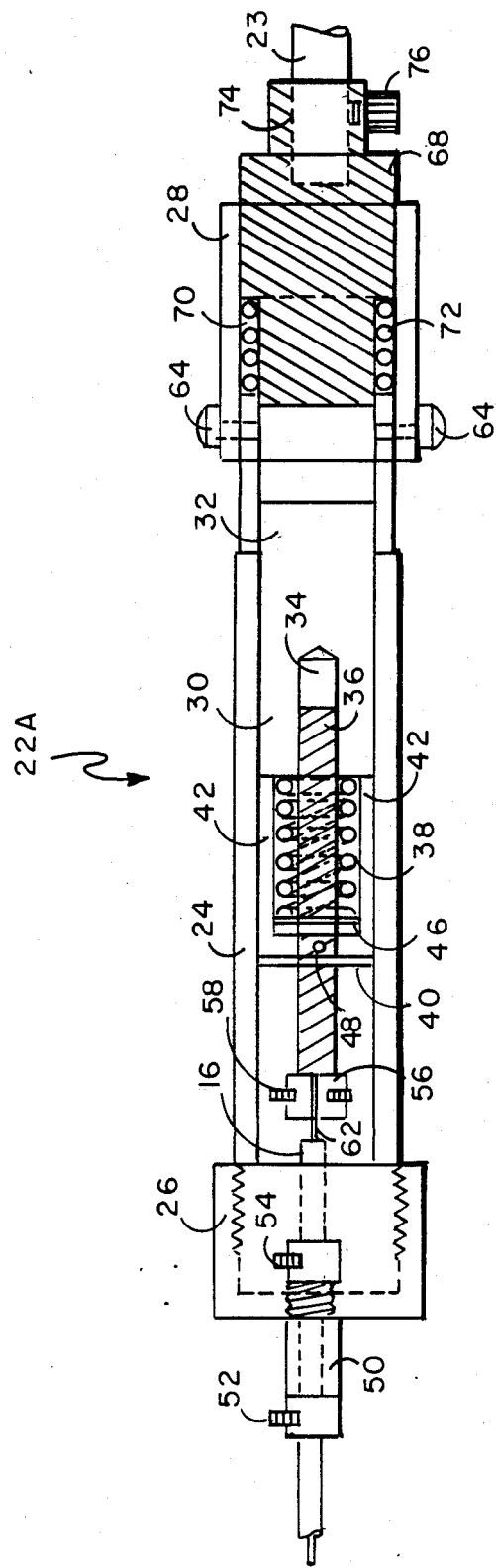
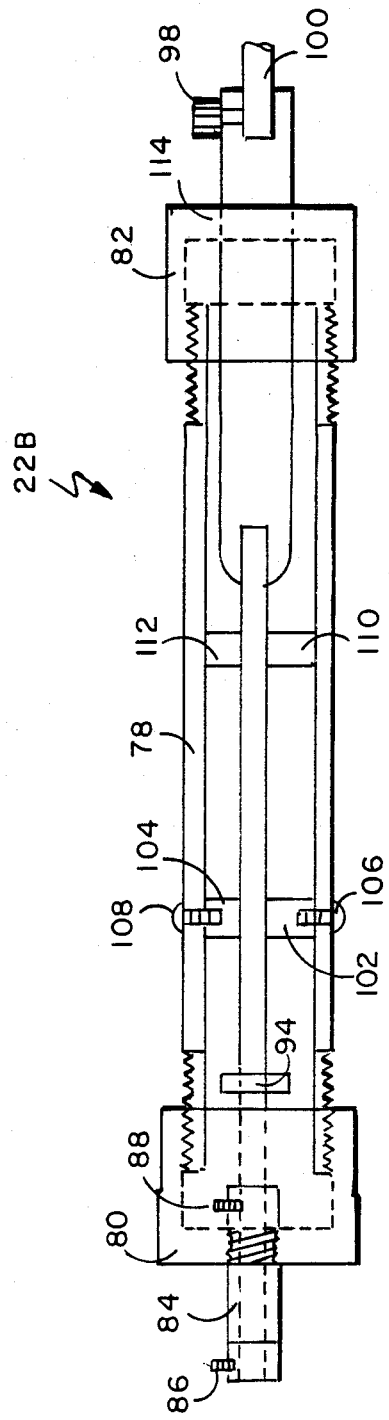
FIG. 2
FIG. 3

POWER OPERATED RECIPROCATING HAND TOOL

BACKGROUND OF THE INVENTION

1. Field of the Invention

The invention resides in the field of hand-held power operated cutting tools and more particularly relates to devices producing a reciprocating motion of the tool.

2. Description of the Prior Art

Reciprocating power-driven hand tools are known to exist in the prior art. Typical are such devices as the well-known jack hammer. In particular U.S. Pat. No. 1,665,109, Nelson, shows a hand-held chisel-like trimmer arranged to receive hammer blows. U.S. Pat. No. 2,754,585, Green, similarly discloses a trimmer with a self-contained sliding hammer. U.S. Pat. No. 2,984,241, Carlson, describes a solenoid-powered surgical osteotome which reciprocates by vibrating action and finally U.S. Pat. No. 4,452,316, Edwards, discloses a reciprocating chisel blade power hoe.

The inventor knows of no device in the prior art which anticipates the inventive combination disclosed below.

SUMMARY OF THE INVENTION

The invention may be summarized as a power-operated reciprocating hand tool which uses a flexible sleeve and flexible cable arranged to slide within the sleeve. An eccentric attached to one end of the cable moves the cable back and forth when the eccentric is rotated by a suitable power source, an electric drill for example. At the opposite end of the cable handle, means for attaching a cutting tool are attached and adapted such that reciprocation of the cable similarly reciprocates the cutting tool.

Two alternative modes of operation are possible using two different cutting tool attaching handles. The first yields continuous reciprocation by using a direct connection between the cable and a tool slideably mounted in a body attached to the sleeve. The second produces intermittent reciprocation by mounting the tool in a spring-biased end cap slideably mounted on a body attached to the sleeve. The cable is attached to a mallot head slideably mounted in the body which is also spring-biased and reciprocates as the cable reciprocates. As the cutting tool, a chisel or gauge for example, is pressed against a work piece, the tool and the spring-biased end cap are depressed toward the reciprocating mallot. When the cap is sufficiently depressed, the mallot will strike the cap and transmit the blow to the tool.

These and other features and advantages of the invention will become more clear from the description of the preferred embodiment and the drawing which follow.

DESCRIPTION OF THE DRAWINGS

FIG. 2 is a cross-sectional view of one component of the embodiment of FIG. 1;

FIG. 3 is a cross-sectional view of an alternative component of the embodiment of FIG. 1;

DESCRIPTION OF THE PREFERRED EMBODIMENT

Figure 1:
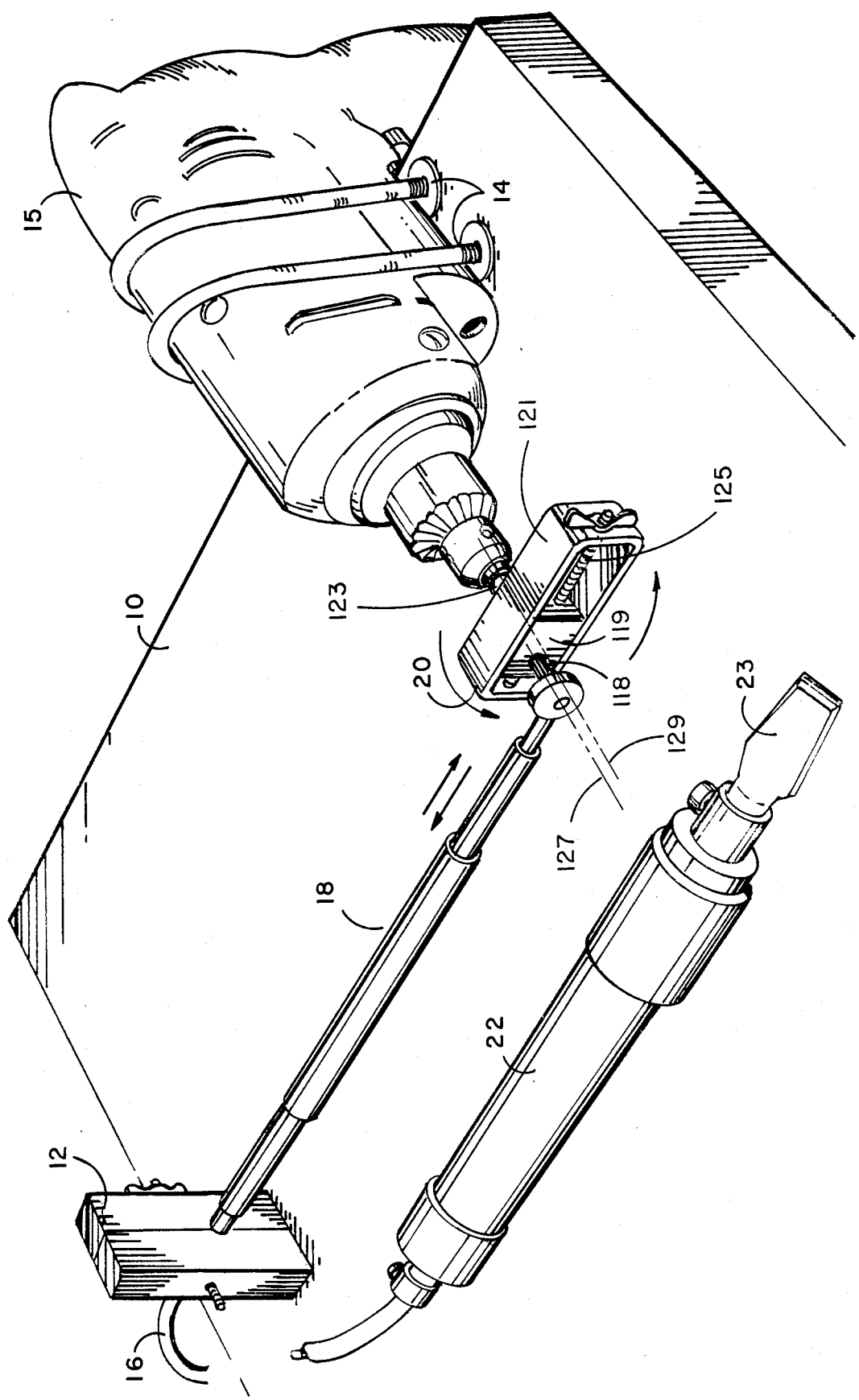
FIG. 1 is a pictorial three-dimensional illustration of the invention.

Referring to FIG. 1, there is illustrated in pictorial format the several components which comprise the preferred embodiment of the invention. Base 10 supports sleeve mount 12 and power unit bracket 14. The power unit may be any suitable rotating electrical device such as a home-sized hand drill. Flexible sleeve 16 is secured to bracket 12 and has a flexible cable slideably mounted therein. The cable, not shown, is attached to an interface unit 18 which in turn is attached to eccentric 20 mounted on and rotated by drill 15. The opposite end of the cable is connected to a handle unit 22, which functions to attach a cutting tool 23 to the cable.

The cutting tool attaching handle 22 may be arranged to provide either continuous or intermittent reciprocation of the tool. This is accomplished by the internal construction of the handle, a part of which is attached to the cable which moves back and forth within the sleeve as the eccentric is rotated by the drill.

Referring next to FIG. 2, there is shown a cross-sectional view of an attaching handle which produces intermittent reciprocation. The handle designated overall as 22a, is comprised of a main hollow body 24, a sleeve and cable-receiving end cap 26 and a cutting tool attaching end cap 28.

Within the body 24 is a sliding mallot assembly 30. The mallot assembly consists of mallot head 32, a mallot shaft 36 slideably disposed in the center of the head in bore 34, and a shock absorbing assembly 38. The shock absorbing assembly consists of an aligning plate 40 suspended by supports 42 and a coil spring 44 positioned between head 32 and retaining plate 46 held by pin 48 passing through shaft 34.

End cap 26 is attached to body 24 by threads 25 or other appropriate means and has sleeve aligning tube 50 mounted at its center. Sleeve clamping set screws 52 and 54 are positioned at each end of tube 50 which screws when tightened secure the sleeve to the handle but allow the sleeve to rotate freely.

Mallot shaft 34 has cable clamping tube 56 attached at the lower end. Cable clamping screws 58 and 60 secure the cable 62 to the mallot shaft 34 resulting in the reciprocation of the shaft as the cable reciprocates.

End cap 28 is arranged to slide over body 24 and is limited in travel by cap screws 64 which fit in milled slots 66. Plug 68 is force-fitted in the end of cap 28 and has space 70 for receiving cap biasing coil spring 72 which bears against the end of body 24 to force the cap outward to the extent allowed by cap screws 64.

Plug 68 has a hole 74 at its end for receiving the shank of a chisel or gauge 23. Screw 76 is threaded laterally into the plug end for securing the cutting tool.

In operation the mallot assembly 30 reciprocates in body 24 as cable 62 is reciprocated by the power source. In the position shown in the drawing there will be no contact with the plug 68 as it is beyond the reach of the furthest point of travel of mallot head 32. To perform a cut on a workpiece the tip of the cutting tool is pressed against the piece with sufficient force to depress plug 68 toward head 32 by overcoming the outward thrust of spring 72. As the tool is forced forward, contact between head 32 and plug 68 is made resulting in the equivalent of hammer blows upon the tool. The reciprocation of the cutting tool is thus intermittent as the mallot withdraws from contact with plug 76 during each revolution of the power source.

Figure 4:
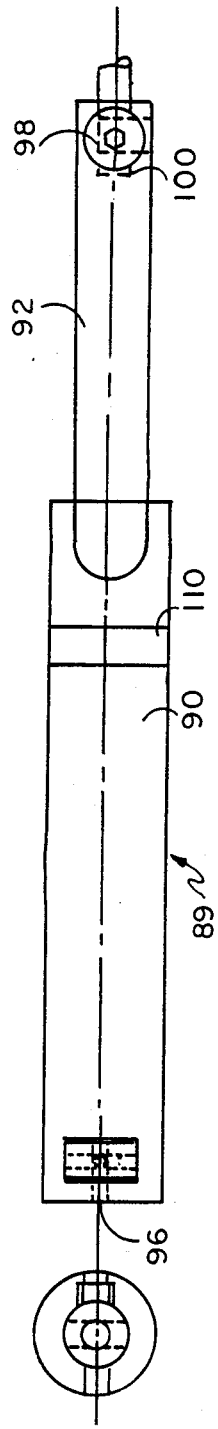
FIG. 4 is a plan view of one of the components of the device of FIG. 3.

Referring next to FIGS. 3 and 4 there is an illustrated alternative cutting tool attaching handle arranged for continuous reciprocation. The handle designated overall as 22b is comprised of a main hollow body 78, a sleeve and cable receiving end cap 80 and a reciprocating shaft receiving end cap 82.

End cap 80 is attached to body 78 by threads 81 or other appropriate means and has sleeve aligning tube 84 mounted at its center. Sleeve clamping screws 86 and 88 are positioned at each end of tube 84 which screws when tightened secure the sleeve to the handle but allow the sleeve to rotate freely.

Reciprocating shaft 89 is slideably disposed in body 78 and is composed of a flat portion 90 and a rounded portion 92. Means for securing the reciprocating cable to the shaft such as cable clamp 94 disposed in port 96 are located in the flat portion of the shaft. Means for attaching a cutting tool 23b to the shaft such as cap screw 98 communicating with port 100 are located in the rounded portion of the shaft. End cap 82 is attached to body 78 by threads or other suitable means and has port 114 for receiving rounded shaft portion 92.

Two sets of stabilizers provide bearing surfaces to facilitate the movement of shaft 88 within body 78. The first set, 102 and 104 is attached to the body by screws 106 and 108. The second set 110 and 112 is welded to the shaft. Both are half round configuration. The shaft slides between stabilizers 102 and 104 and stabilizers 110 and 112 slide along the body inner wall.

Figure 5:
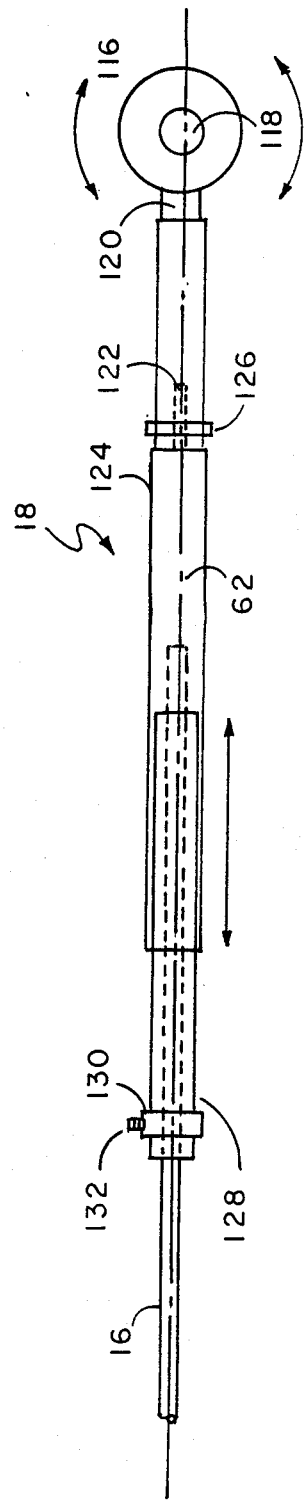
FIG. 5 is a cross-sectional view of an additional component of the embodiment of FIG. 1.

Referring next to FIG. 5 there is shown a cross-sectional illustration of an interface unit suitable for attaching the sleeve and cable to the eccentric to provide a smooth and even transfer of power from the rotating eccentric to the reciprocating cable. Bushing 116 fits over eccentric output shaft 118 mounted on block 119 which is in turn slideably mounted in frame 121. The opposed fixed offset input shaft 123 is attached to the rotating power source. The distance between the two shafts may be adjustable to provide for variable distances of cable throw by rotating threaded shaft 125 to position block 119. Rod 120 is attached to bushing 116 and has cable receiving port 122. Tube 124 fits over the rod and is attached thereto by screws 12 which also serve to clamp cable 62 in place.

Tube 128 is attached to sleeve 16 by clamp member 130 and screw 132. In operation, as the axis of eccentric shaft 118 revolves in a circle, the diameter of which is determined by the offset of the axis 127 of shaft 118 from the axis 129 of rotated shaft 123, tube 124 slides back and forth over tube 128 and cable 62 is reciprocated in sleeve 16. The tubes essentially provide large diameter co-sliding extensions of the smaller diameter sleeve and cable. As a result, any tendency of the cable to buckle in the sleeve during reciprocation is eliminated.

Variations in the above described apparatus will be obvious to those skilled in the art. Accordingly, the invention is therefore defined by the following claims:

I claim:

1. A power operated reciprocating hand tool adapted for receiving cutting tools comprising in combination:
   a. a flexible sleeve;
   b. a base;
   c. means for attaching one end of said sleeve to said base;
   d. a flexible cable slideably disposed in said sleeve, one end of said cable extending beyond the end of said sleeve attached to said base;
   e. means for mounting a rotational power source on said base;
   f. a rotatable eccentric adapted to be rotated by said power source whereby said cable will be reciprocated within said sleeve upon rotation of said power source;
   g. means for attaching said cable to said eccentric;
   h. handle means for attaching a cutting tool to the opposite end of said cable from said eccentric arranged to provide intermittent reciprocation of said tool, said handle means comprising in combination:
      1. a hollow body;
      2. a first cap attached to one end of said body, said cap having a port for receiving said sleeve and said cable;
      3. means for attaching said sleeve to said cap;
      4. a shaft positioned within said body attached to said cable;
      5. a mallot slideably mounted in said body, said mallot having a port for slideably receiving said shaft;
      6. spring retaining means mounted upon said shaft;
      7. a coil spring surrounding said shaft positioned between said spring retaining means and said mallot;
      8. a second cap slideably mounted on the opposite end of said body from said first cap;
      9. means to limit the travel of said second cap;
      10. means to attach a cutting tool to said second cap;
      11. a coil spring positioned between the end of said body and said second cap whereby said second cap is forced forward of said body; and
      12. a striker attached within said cap positioned to be contacted by said mallot whereby said cutting tool will be intermittently impacted upon the reciprocation of said cable.

2. A power operated reciprocating hand tool adapted for receiving cutting tools comprising in combination:
   a. a flexible sleeve;
   b. a base;
   c. means for attaching one end of said sleeve to said base;
   d. a flexible cable slideably disposed in said sleeve, one end of said cable extending beyond the end of said sleeve attached to said base;
   e. means for mounting a rotational power source on said base;
   f. a rotatable eccentric adapted to be rotated by said power source whereby said cable will be reciprocated within said sleeve upon rotation of said power source;
   g. means for attaching said cable to said eccentric; and
   h. handle means for attaching a cutting tool to the opposite end of said cable from said eccentric arranged to provide continuous reciprocation of said tool, said handle means comprising in combination:
      1. a hollow body;
      2. a first cap attached to one end of said body, said cap having a port for receiving said sleeve and said cable;
      3. means for attaching said sleeve to said cap;
      4. a second cap attached to the opposite end of said body, said cap having a port for receiving a cutting tool;
      5. a shaft slideably mounted in said body attached to said cable; and 6. means to attach a cutting tool to said shaft whereby said cutting tool will be continuously reciprocated upon the reciprocation of said cable.

3. A power operated reciprocating hand tool adapted for receiving cutting tools comprising in combination:
   a. a flexible sleeve;
   b. a base;
   c. means for attaching one end of said sleeve to said base;
   d. a flexible cable slideably disposed in said sleeve, one end of said cable extending beyond the end of said sleeve attached to said base;
   e. means for mounting a rotational power source on said base;
   f. a rotatable eccentric adapted to be rotated by said power source whereby said cable will be reciprocated within said sleeve upon rotation of said power source;
   g. means for attaching said cable to said eccentric comprising:
      1. a bushing attached to said eccentric;
      2. a rod member attached to said bushing, said rod member having a port for receiving said cable;
      3. screw means for securing said cable in said rod port;
      4. a first tube arranged to fit over and attached to said rod, said tube extending beyond said rod;
      5. a second tube attached to said sleeve arranged to slideably fit in said first tube; and
      6. handle means for attaching a cutting tool to the opposite end of said cable from said eccentric whereby upon reciprocation of said cable in said sleeve, said tool will similarly reciprocate to provide a cutting force upon said workpiece.

4. The apparatus of claim 3 wherein the spacing between the input shaft and output shaft of said eccentric is variable.

* * * * *